United States Patent [19]

Nishimura et al.

[11] 3,843,928

[45] Oct. 22, 1974

[54] FM DEMODULATION SYSTEM PROVIDING NOISE REDUCTION PROPERTY

[75] Inventors: Katsutoshi Nishimura, Osaka; Kiyoji Fujisawa, Nara, both of Japan

[73] Assignee: Matsushita Electric Industrial Co., Ltd., Osaka, Japan

[22] Filed: July 20, 1973

[21] Appl. No.: 381,334

[30] Foreign Application Priority Data

July 28, 1972 Japan ................................ 47-76161

July 28, 1972 Japan ................................ 47-76162

[52] U.S. Cl. .................... 325/348, 325/65, 325/474, 325/478, 329/128, 328/165

[51] Int. Cl. ............................................ H04b 1/10

[58] Field of Search ............ 325/65, 338, 341, 344, 325/347, 348, 349, 395, 402, 408, 411, 473, 474, 478; 329/126, 128; 328/165, 167

[56] References Cited

UNITED STATES PATENTS 3,588,705 6/1971 Paine ................................ 325/348

*Primary Examiner*—Albert J. Mayer
*Assistant Examiner*—Marc E. Bookbinder
*Attorney, Agent, or Firm*—Wenderoth, Lind & Ponack

[57] ABSTRACT

An FM demodulation system having means for noise reduction. The system has a signal path which includes a limiter, an FM demodulation circuit and a gate circuit, and a control circuit which includes a differentiator, two mono-stable-multivibrators, an adder and a gate signal generator. The input of this control circuit is coupled to the output of the limiter and the output of the control circuit is coupled to the control terminal of the gate circuit so as to apply a gate signal to the gate circuit. The gate circuit in the signal path operates in such a way that a demodulated signal is passed to the output terminal of the system when the gate signal is not present and the demodulated signal is prevented from passing to the output terminal when the gate signal is present. The control circuit generates the gate signal when a dropout in the FM signal occurs in the following manner. The signal from the limiter is differentiated by the differentiator and is formed into a narrow pulse train having positive and negative polarities. The positive spikes and the negative spikes of this pulse train trigger the respective ones of two mono-stable-multivibrators, and the outputs from these multivibrators are added by the adder. The output pulse-width of these multivibrator is controlled so that a marker signal appears at the output of the adder when carrier dropout in the FM signal occurs. The gate signal generator generates the gate signal from the marker signal and the resulting gate signal is fed to the control terminal of the gate circuit. a result, a noise component does not appear at the output terminal.

4 Claims, 8 Drawing Figures

FM DEMODULATION SYSTEM PROVIDING NOISE REDUCTION PROPERTY

BACKGROUND OF THE INVENTION

1. Field of the Invention

This invention relates generally to systems for demodulating frequency modulated signals, and more particularly to FM demodulation systems provided with noise suppression means for audio applications.

2. Description of the Prior Art

An FM demodulation system is often employed in a tape recorder, an FM receiver, a television receiver, etc. In the conventional FM demodulation system, an impulsive noise is apt to appear in the output signal when a dropout of the carrier occurs or an external noise is received. It is well known that a noise which occurs in the absence of a signal can be eliminated by means of a muting circuit, but the common muting circuit can not usually eliminate the impulsive noise which occurs in the case where the received signal disappears partly due to so-called "dropout of carrier." There have been employed various methods for suppressing the impulsive noises. However, these methods have a disadvantage that they require a complicated circuit arrangement, and they are also disadvantageous because of their high cost.

BRIEF SUMMARY OF THE INVENTION

Therefore, an object of the present invention is to provide a novel and improved FM demodulation system.

A further object of this invention is to provide a novel FM demodulation system for demodulating a signal without noise generation due to a carrier dropout or receipt of an external noise.

Another object of this invention is to provide a system for demodulating frequency modulation signals, which is suitable for applying to a tape recorder, an FM receiver, a television receiver, an audio system, etc., for domestic use.

These objects are achieved by providing a system for demodulating the frequency modulation signals according to the present invention, which comprises a limiter which receives an input frequency modulated signal to be demodulated and eliminates an amplitude variation in the input frequency modulated signal, a demodulation means for demodulating said input frequency modulated signal, a differentiator connected to the output of said limiter which differentiates the output of said limiter and forms a narrow pulse train having positive and a negative spikes, a first mono-stable multivibrator which is coupled to the output of said differentiator and is triggered by the positive spikes of the pulse train from said differentiator, a second mono-stable multivibrator which is coupled to the output of said differentiator and is triggered by the negative spikes of the pulse train from said differentiator, said first and second mono-stable multivibrators being controlled so that the pulse-width of the output pulse thereof has a duration slightly shorter than the interval between the zero crossing points of said input frequency modulated signal where the frequency deviation of said input frequency modulated signal becomes a maximum in the negative direction, an adder for adding said output pulses of said first and second mono-stable multivibrators, a gate signal generator for generating a gate signal according to the added output from said adder, and a gate circuit which is coupled between the output of said demodulation means and an output terminal of said system and has a control terminal which receives said gate signal from said gate signal generator, said gate circuit operating in such a way as to pass the input signal thereof to said output terminal when said gate signal is not present at said control terminal and to prevent said input signal thereof from passing to said output terminal when said gate signal is present at said control terminal, whereby a demodulated signal from which the noise component is eliminated appears at said output terminal of said system.

BRIEF DESCRIPTION OF THE DRAWING

These and other objects of the invention will be apparent from a consideration of the following detailed description with reference to the accompanying drawings, wherein.

FIGS. *2A*– *2F* show the signal waveforms occurring at different points during the operation of the circuit shown in FIG. 1.

DETAILED DESCRIPTION OF THE PREFERRED EMBODIMENT

Figure 1:
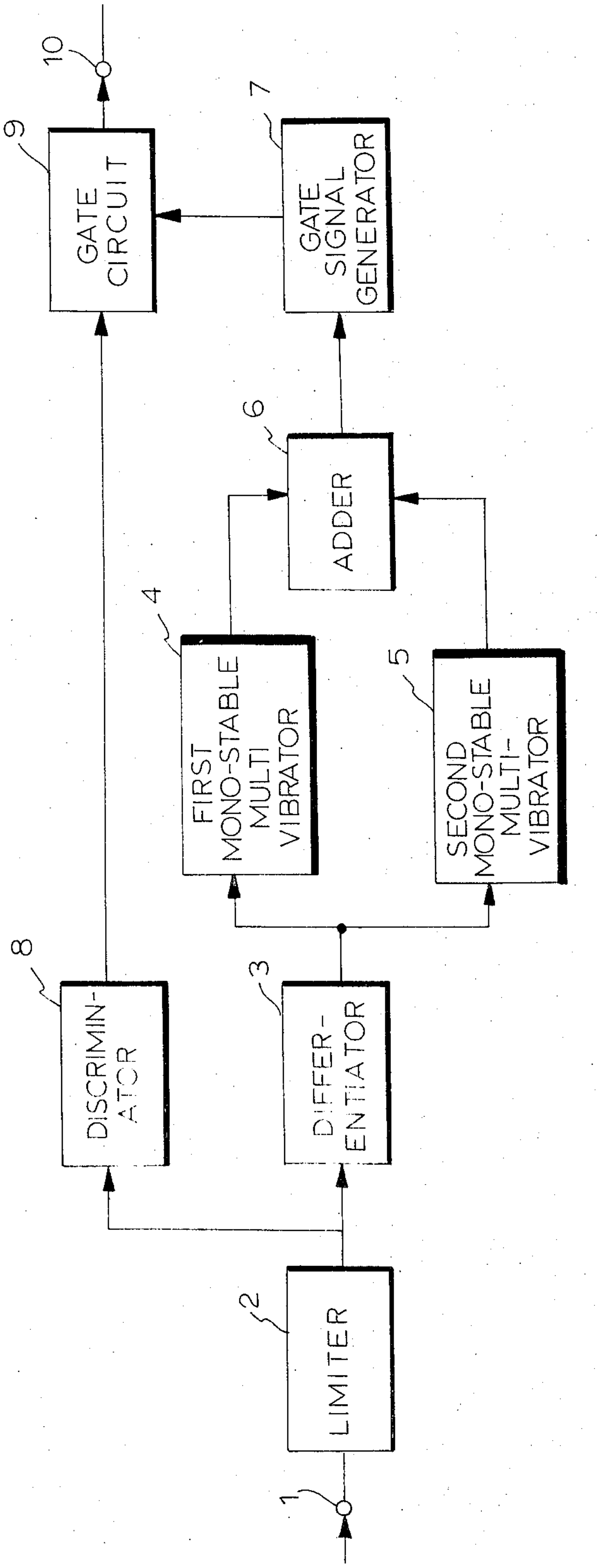
FIG. 1 is a block diagram of a preferred embodiment of the present invention.

In FIG. 1, the point designated by reference numeral 1 is an input terminal where there is applied a frequency modulated signal to be demodulated. A block 2 represents a limiter which is connected to the input terminal 1 and eliminates the amplitude variation in the input frequency modulated signal. A block 3 represents a differentiator which differentiates the output signal of the limiter 2. A block 4 designates a first mono-stable multivibrator which is triggered by the positive pulses of a pulse train supplied from the differentiator 3. A block 5 represents a second mono-stable multivibrator which is triggered by the negative pulses of the pulse train supplied from the differentiator 3. A block 6 represents an adder for adding the output signals from the first and second mono-stable multivibrators. A block 7 represents a gate signal generator for generating a gate signal which controls a gate circuit 9 when the output signal supplied thereto from the adder 6 represents equal to zero. A block 8 is a discriminator which demodulates the frequency modulated signal. The gate circuit 9 has a signal input terminal connected to the output of the discriminator 8 and a control terminal connected to the gate signal generator 7, and it operates so as to prevent the information signal supplied to the input terminal from passing to an output terminal 10 when the gate signal is applied at the control terminal thereof.

The signal waveforms at the different points of the circuit of FIG. 1 are shown in FIGS. 2A–2F. In the parts of FIG. 2, the length of time from $t_1$ to $t_2$ is where a drop out of the carrier or an incoming impulsive noise occurs.

Figures 2A, 2B, 2C, 2D, 2E, 2F:
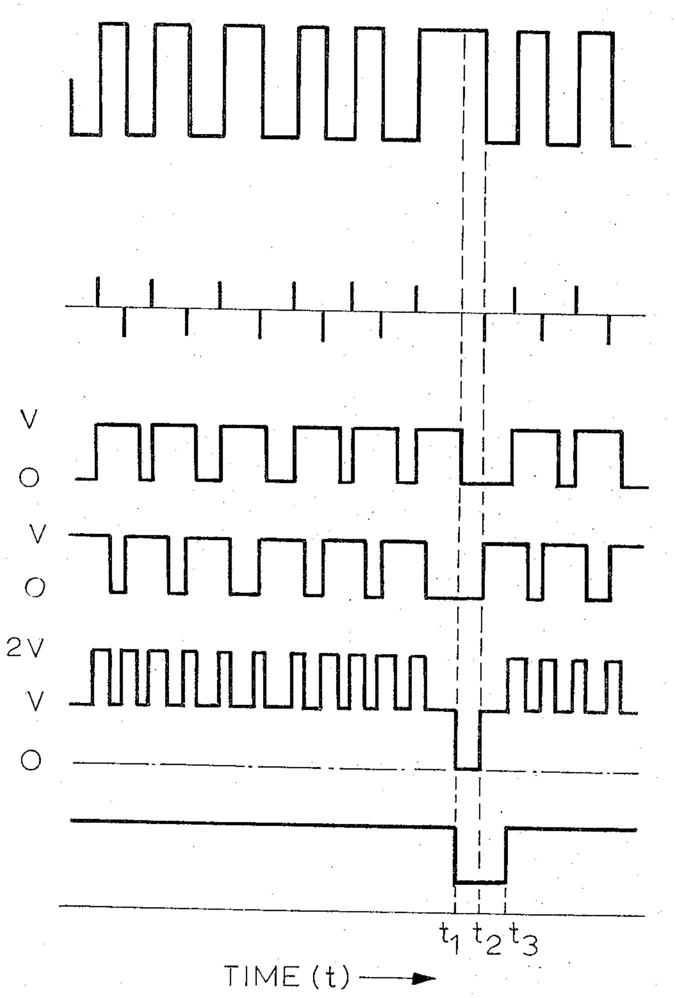

Referring to FIGS. 1 and 2, the operation of the embodiment of this invention will be explained. The frequency modulated signal applied at the input terminal 1 is amplified and the amplitude variation thereof is eliminated by the limiter 2. Now, it is assumed that the resulting limiter output signal has a rectangular waveform as shown in FIG. 2(A). This signal is applied to the differentiator 3. The differentiator 3 produces an output pulse train signal as shown in FIG. 2(B). The circuit of this embodiment of this invention is designed so that the positive pulses of the pulse train as shown in FIG. 2(B) trigger the first mono-stable multivibrator 4, and the negative pulses trigger the second mono-stable multivibrator 5. The output waveforms of the first and second mono-stable multivibrators 4 and 5 are shown in FIGS. 2(C) and 2(D) respectively.

These mono-stable multivibrators are such that the output voltage in the stable state is zero and the output voltage in the quasi-stable state is V. The length of time of the quasi-stable state of these mono-stable multivibrators 4 and 5 is designed in such a way that it is slightly shorter than the length of time of the zero crossing interval of the frequency modulated signal where the frequency deviation of the frequency modulated signal has a maximum in a negative direction.

Both output signals of the first and second mono-stable multivibrators are added by the adder 6, and an output signal shown in FIG. 2(E) appears at the output terminal of the adder 6. The output voltage of the adder 6 becomes 2V when the output voltages of both of the first and second mono-stable multivibrators 4 and 5 are V at the same time, and the output voltage of the adder 6 becomes V when the output voltage of one of two mono-stable multivibrators is zero.

Now, it is assumed that, during the time from $t_1$ to $t_2$ shown in FIG. 2, there occurs a disturbance of the phase of the frequency modulated signal due to a noise. In such a case, there exists a length of time where both the first and second mono-stable multivibrators are in the stable state condition at the same time, and therefore, the output voltage of the adder 6 becomes zero. The length of time where the signal appearing at the output of the adder 6 has zero voltage corresponds to the length of time during which the noise exists. Therefore, if the gate circuit 9 is closed during this time, there is no noise appearing at the output terminal 10.

The output signal of the adder 6 is supplied to the gate signal generator 7 which generates the gate signal shown in FIG. 2(F) when the adder 6 has a zero output voltage level. That is, the length of time during which the gate circuit 9 is controlled by the gate signal always coincides with the length of time of the noise. Therefore, the noise is prevented from passing to the output terminal 10.

Usually, there is a transient due to the characteristics of the discriminator 8. In this case, it is desirable that, until the time at which the transient ceases, the signal blocking conditions of the gate circuit 9 should be continued for eliminating the output noise completely. FIG. 2(F) shows a gate pulse waveform for this condition, where the gate has a pulse-width which is represented by the length of from $t_1$ to $t_3$.

In practice, the output of the system has very small residual noise components because of the time lag in the gate function. The problem which will be caused by these noise components is usually negligible. However, if necessary, by inserting a delay circuit in a pre-stage of the gate circuit 9 so as to delay applying of the information signal to the gate circuit 9, it is possible to remove the remaining noise from the output.

Figure 3:
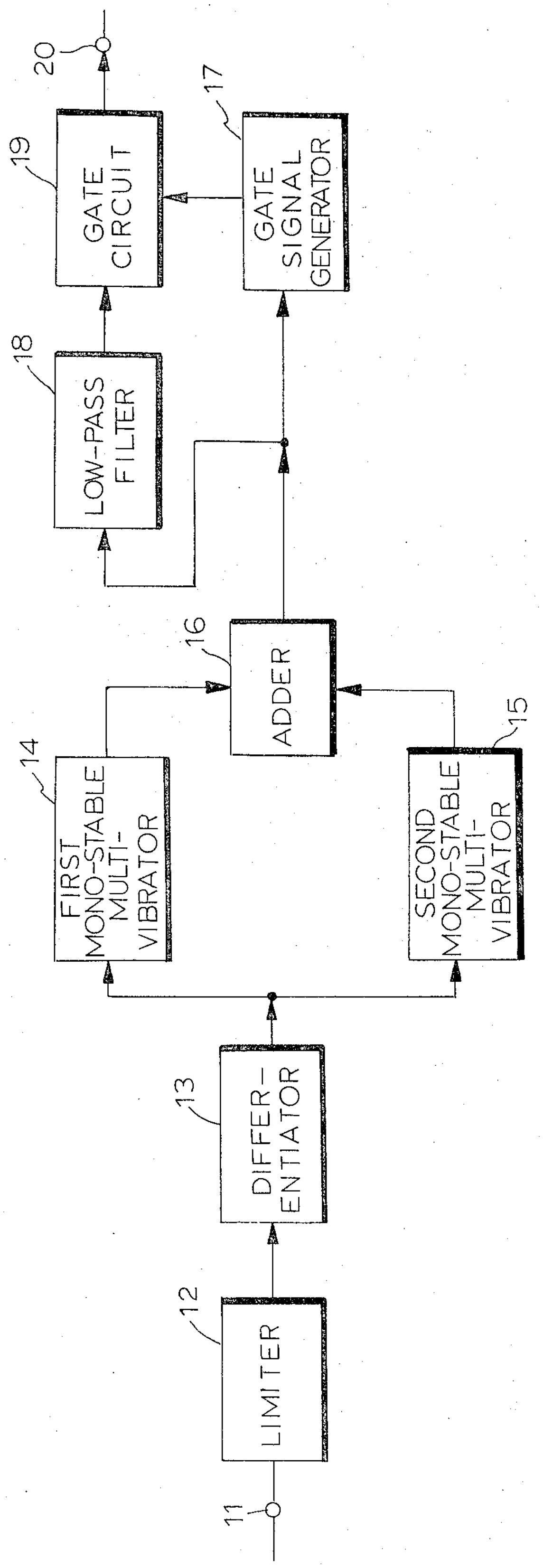
FIG. 3 is a block diagram of another preferred embodiment of the present invention.

FIG. 3 shows another embodiment of the present invention, wherein the point 11 is an input terminal where there is applied a frequency modulated signal to be demodulated. A block 12 represents a limiter which is connected to the input terminal 11 and eliminates the amplitude variation in the input frequency modulated signal. A block 13 represents a differentiator which differentiates the output signal of the limiter 12. A block 13 represents a first mono-stable multivibrator which is triggered by the positive pulses of a pulse train supplied from the differentiator 13. A block 15 represents a second mono-stable multivibrator which is triggered by the negative pulses of the pulse train supplied from the differentiator 13. A block 16 represents an adder for adding the output signals from the first and second mono-stable multivibrators. A block 17 represents a gate signal generator for generating a gate signal which controls a gate circuit 19, when the output signal supplied from the adder 16 is zero. A block 18 represents a low-pass filter for obtaining an information signal contained in the output signal of the adder 16. The gate circuit 19 has a signal input terminal connected to the output of the low-pass filter 18 and a control terminal connected to the gate signal generator 17, and it operates so as to prevent the information signal applied at the input terminal thereof from passing to an output terminal 20 when the gate signal is applied at the control terminal thereof.

FIGS. 2A – 2F can be used for illustrating the waveforms occuring at the different points of the circuit shown in FIG. 3. Now, referring to FIGS. 2 and 3, the operation of this embodiment of this invention will be explained.

The frequency modulated signal applied at the input terminal 11 is amplified, and the amplitude variation thereof is eliminated by the limiter 12. Now, it is assumed that the resulting limiter output signal has a rectangular waveform as shown in FIG. 2(A). This signal is supplied to the differentiator 13. The differentiator 13 produces an output pulse train signal as shown in FIG. 2(B). The circuit of this embodiment of this invention is designed so that the positive pulses of the pulse train as shown in FIG. 2(B) trigger the first mono-stable multivibrator 14, and the negative pulses trigger the second mono-stable multivibrator 15. The output waveforms of the first and second mono-stable multivibrators 14 and 15 are shown in FIG. 2(C) and 2(D), respectively.

These mono-stable multivibrators, are such that the output voltage in the stable state is zero and the output voltage in the quasi-stable state is V. The length of time of the quasi-stable state of these mono-stable multivibrators 4 and 5 is designed in such a way that it is slightly shorter than the length of time of the zero crossing interval of the frequency modulated signal where the frequency deviation of the frequency modulated signal has a maximum in a negative direction.

Both output signals of the first and second mono-stable multivibrators are added by the adder 16, and an output signal shown in FIG. 2(E) appears at the output terminal of the adder 16. The output voltage of the adder 16 becomes 2V when the output voltage of both of the first and second mono-stable multivibrators 14 and 15 are V at the same time, and the output voltage of the adder 16 becomes V when the output voltage of one of two mono-stable multivibrators is zero.

Now, it is assumed that, during the length of time from $t_1$ to $t_2$ shown in FIG. 2, there occurs a disturbance of the phase of the frequency modulated signal due to a noise. In such a case, there exists a length of time where both the first and second mono-stable multivibrators are in the stable state condition at the same time, and therefore, the output voltage of the adder 16 becomes zero. The length of time where the signal appearing at the output of the adder 16 has zero voltage corresponds to the length of time during which the noise exists.

On the other hand, since the output signal of the adder 16 has an information component which has a regular frequency spectrum and the carrier component, the information component is easily obtained from the adder output signal by passing it through the low-pass filter 18. If the gate circuit 19 is closed during the time from $t_1$ to $t_2$ shown in FIG. 2, there is no noise appearing at the output terminal 20. Therefore, the information component appearing at the output terminal 20 has no noise.

The output signal of the adder 16 is applied to the gate signal generator 17 which generates the gate signal shown in FIG. 2(F) when the adder 16 has a zero output voltage level. That is, the length of time during which the gate circuit 19 is controlled by the gate signal always coincides with the length of time of the noise occurring. Therefore, the noise is prevented from passing to the output terminal 20.

Usually, there is a transient due to the characteritics of the low-pass filter 18. In this case, it is desirable, until the time at which the transient ceases, that the signal blocking conditions of the gate circuit 19 should be continued for eliminating the output noise completely. FIG. 2(F) shows a gate pulse waveform for this condition, where the gate pulse has a pulse-width which is represented by the length of time from $t_1$ to $t_3$.

In practice, the output of the system has very small residual noise components because of the time lag in the gate function. The problem which will be caused by these noise components is usually negligible. However, if necessary, by inserting a delay circuit in a pre-stage of the gate circuit 19 so as to delay applying of the information signal to the gate circuit 19, it is possible to remove the remaining noise from the output.

In above explanation, although the actual circuits used in the various stages are not shown, it is evident that there are various well-known circuits for realizing these circuits, and so the detailed description of them is omitted.

There has been described hereinbefore the preferred embodiments of the invention, but it is apparent that various modifications may be made without departing from the spirit and scope of the invention which is defined by the following claims.

What is claimed is:

1. An FM demodulation system for accomplishing noise reduction comprising:

a limiter which receives an input frequency modulated signal to be demodulated and eleminates an amplitude variation in the input frequency modulated signal;

a demodulation means coupled to said limiter for demodulating said input frequency modulated signal;

a differentiator connected to the output of said limiter, said differentiator differentiating the output of said limiter and forming a narrow pulse train having positive and negative spikes;

a first mono-stable-multivibrator which is coupled to the output of said differentiator and is triggered by the positive spikes of the pulse train from said differentiator;

a second mono-stable multivibrator which is coupled to the output of said differentiator and is triggered by the negative spikes of the pulse train from said differentiator, the output pulses of said first and second mono-stable-multivibrators having a pulse-width with a length of time slightly shorter than the interval of the zero crossing points of said input frequency modulated signal where the frequency deviation of said input frequency modulated signal becomes a maximum in a negative direction; an adder coupled to said mono-stable-multivibrators for adding said output pulses of said mono-stable-multivibrators;

a gate signal generator coupled to said adder for generating a gate signal according to the added output from said adder; and a gate circuit which is coupled to the output of said demodulation means and which has a control terminal coupled to said gate signal generator to receive said gate signal from said gate signal generator, said gate circuit passing the signal from said demodulating means when said gate signal is not present at said control terminal and preventing said signal from passing when said gate signal is present at said control terminal, whereby a demodulated signal in which the noise component is eliminated appears as output of said system.

2. An FM demodulation system as claimed in claim 1, wherein said demodulation means is connected directly to the output of said limiter.

3. An FM demodulation system as claimed in claim 1, wherein said demodulation means is directly connected to the output of said adder.

4. An FM demodulation system as claimed in claim 1, wherein said demodulation means is a low-pass filter having the input thereof connected directly to the output of said adder.

* * * * *